Patented Sept. 7, 1926.

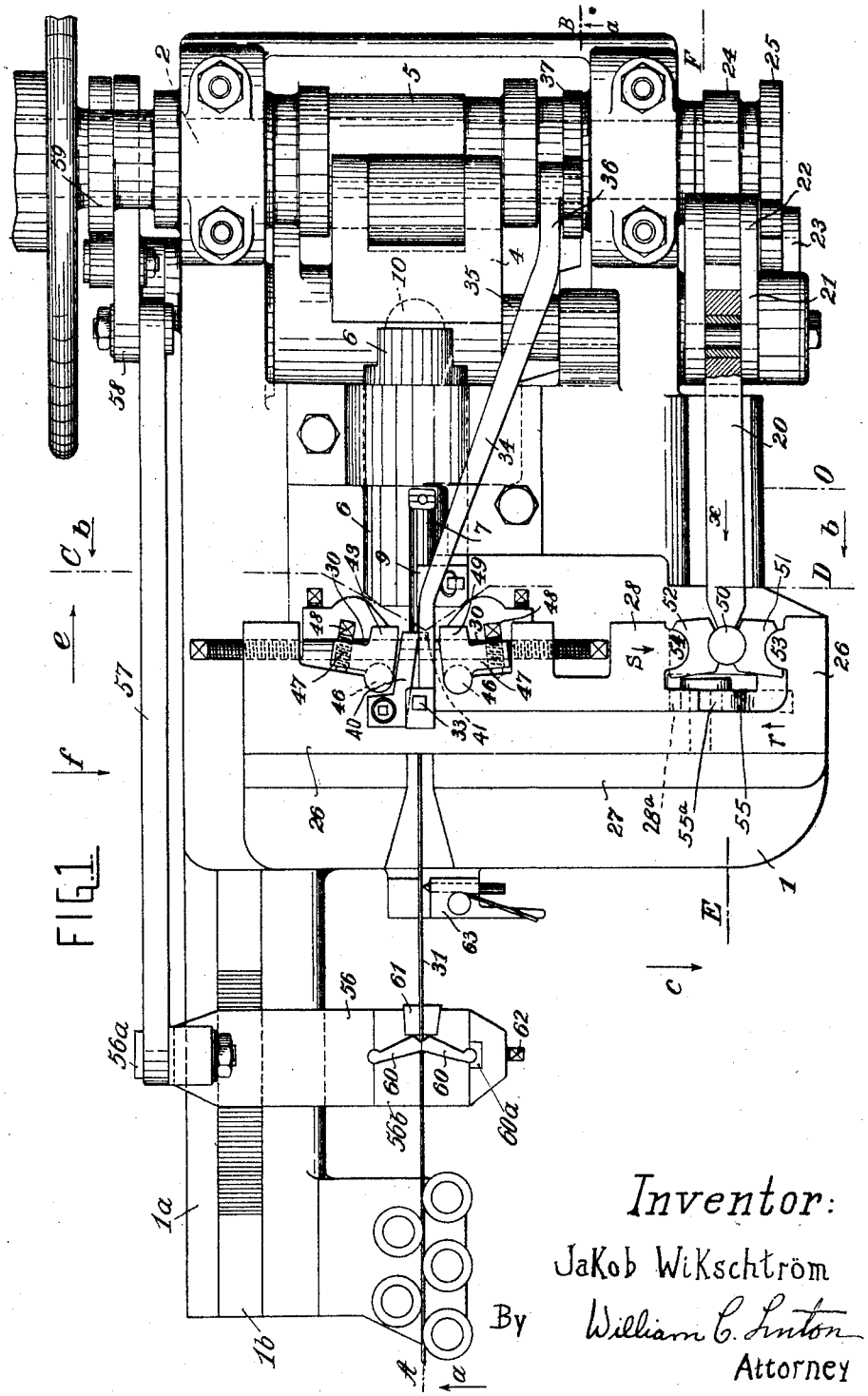

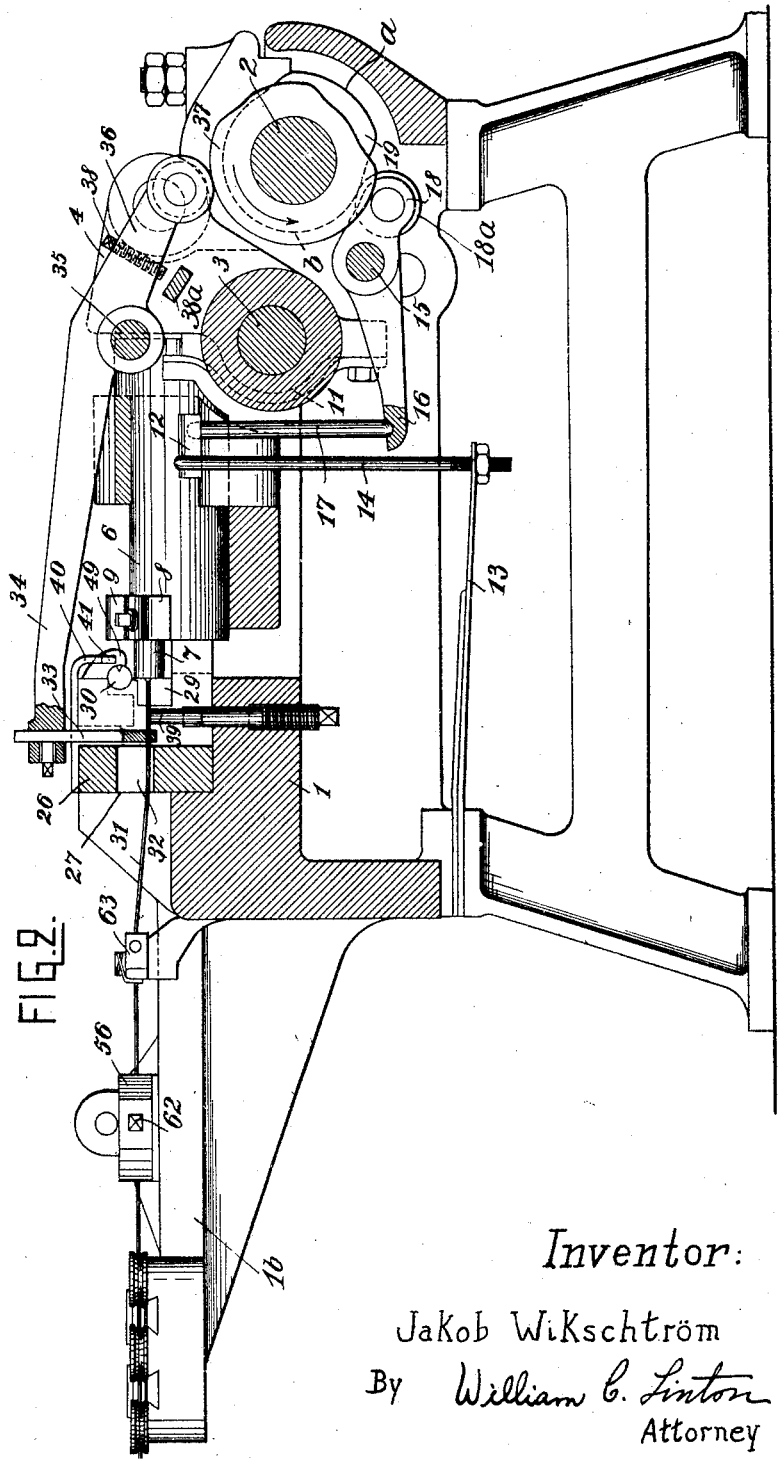

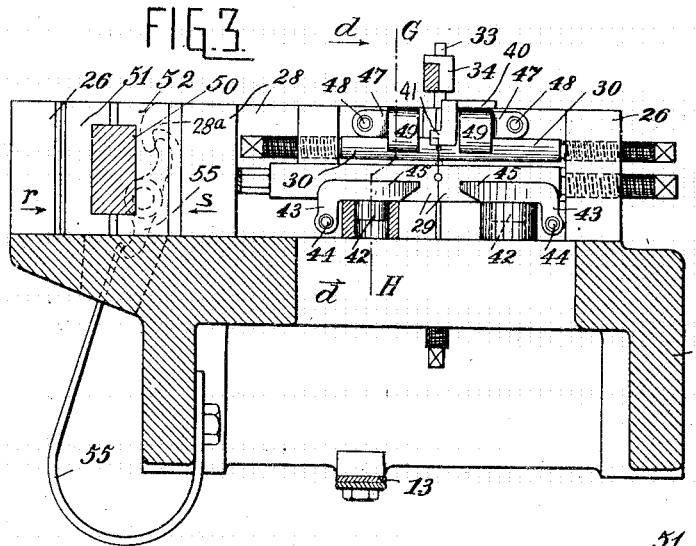
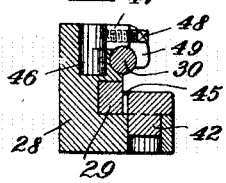
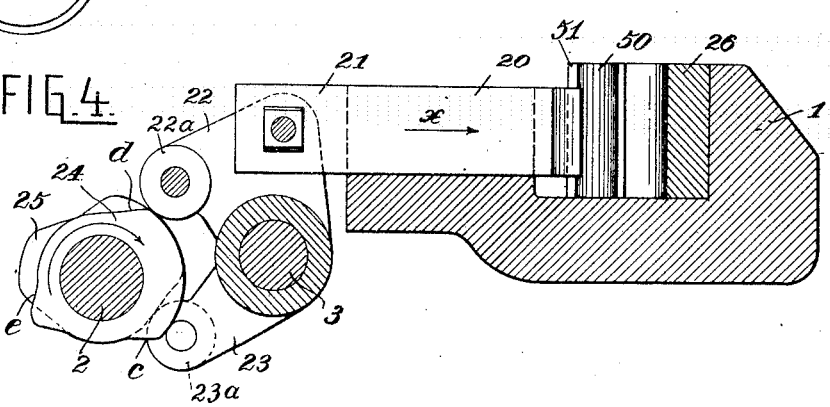
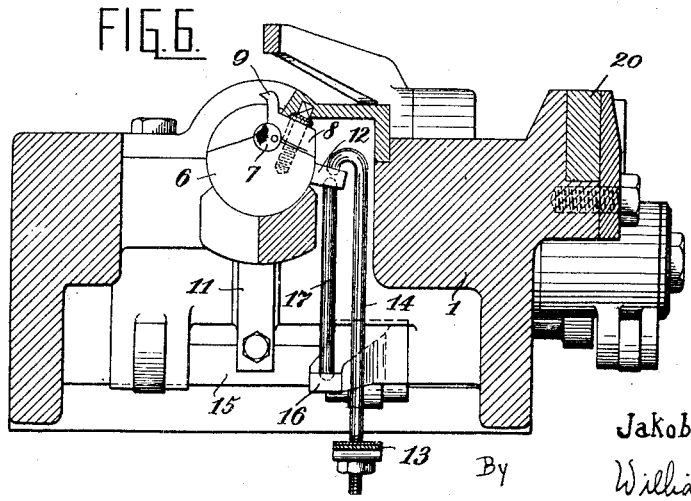
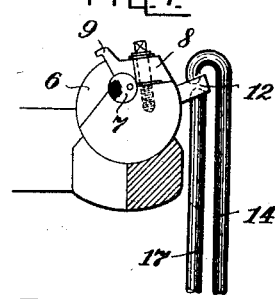

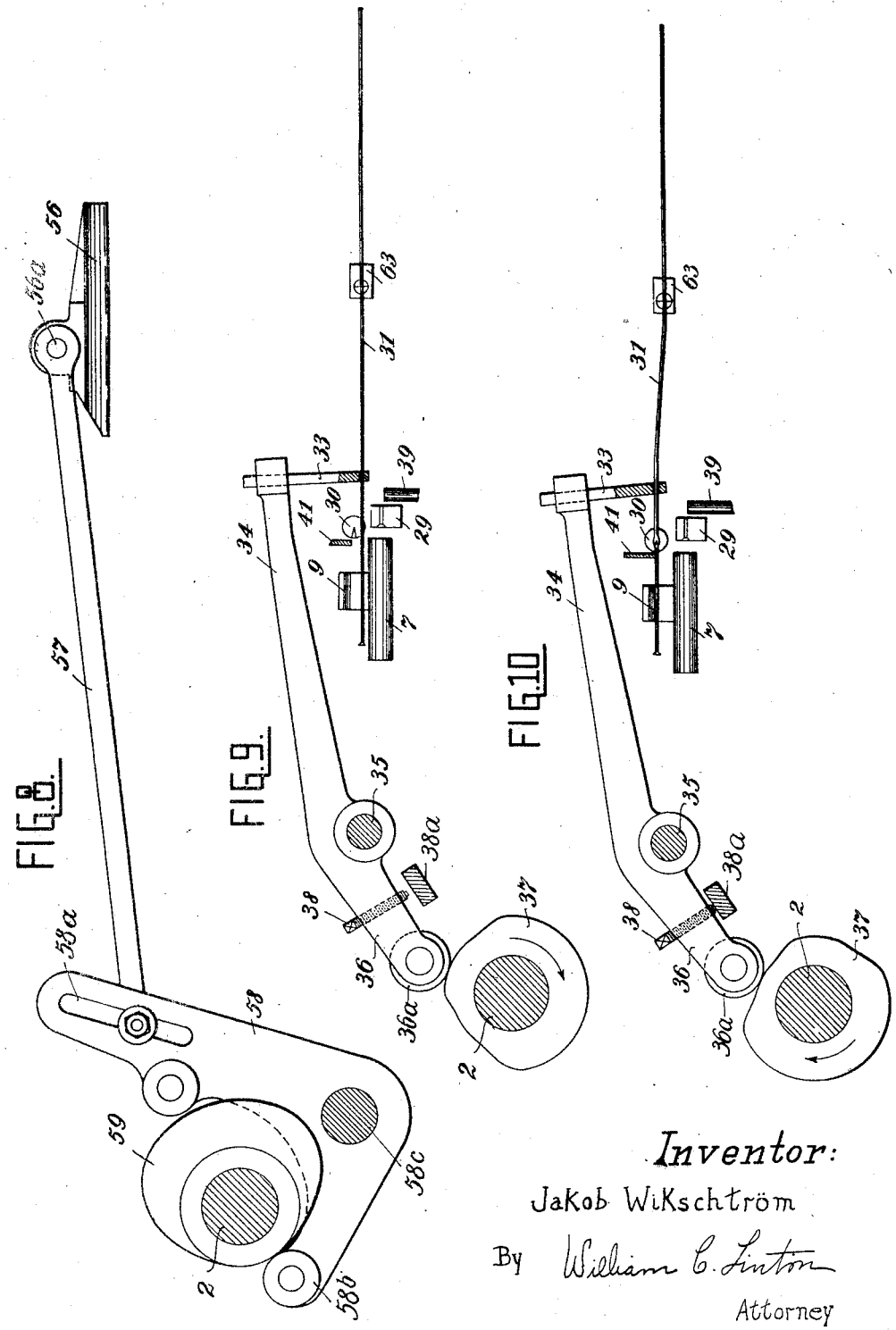

1,599,192

UNITED STATES PATENT OFFICE.

JAKOB WIKSCHTRÖM, OF DUSSELDORF, GERMANY.

MACHINE FOR MANUFACTURING WIRE TACKS.

Application filed November 18, 1924, Serial No. 750,633, and in Germany February 25, 1924.

The gist of my invention resides in that the clamping dies and the point-cutting knives are located in a pair of slides which are movable at right angles with respect to the wire-axis, and that the wire supplied to, or fed into, the machine is caused to pass through a guide-member, by the movements of which it is lifted or lowered, as the case may be, into the height of said clamping dies or of said knives.

There is also a head-pressing die which is located in a longitudinally movable roller-like body which is turned around its axis whereby the preliminary jolting or upsetting and the final jolting or upsetting are alternately effected. The rotary movement of said body is used also for the discharge of the finished tack. Adjusting the clamping dies and the knives, as well as the head-pressing die, can be effected in this improved machine essentially more simply than in the older wire-tack manufacturing machines, as will appear from the detailed description following.

The new arrangement and combination of parts is of such a kind that only comparatively few and short motions are required so that power is saved. But at the same time the working speed is increased and the wear and tear diminished. The adjusting means for the tools are simplified whereby it is rendered possible to exchange and adjust the latter quickly and to save time also thereby. The pressure-effects of the clamping dies and of the cutting knives are not transmitted to the frame of the machine, and, finally, the cost-price of the machine itself is considerably lower owing to the simplifications made.

The improved machine is illustrated, by way of example, in the accompanying drawing in which Figure 1 is a plan thereof, Figure 2 a vertical section in the plane A—B of Figure 1 seen in the direction of the arrow $a$, Figure 3 a vertical section in the plane C—D of Fig. 1 seen in the direction of the arrow $b$, Figure 4 a section in the plane E—F of Fig. 1 seen in the direction of the arrow $c$, Figure 5 a section in the plane G—H of Fig. 3 seen in the direction of the arrow $d$, Figure 6 a section in the plane C—D of Figure 1 seen in the direction of the arrow $e$, the head-pressing die (7) being in that position in which the tack-head is being finished, Figure 7 a separate view of the head-pressing die and some adjacent parts, this die being in the position for the preliminary jolting or upsetting of the tack after the previously finished tack has been discharged, Figure 8 a separate side-view of a mechanical movement forming part of the machine, these parts being those located near the arrow $f$ in Fig. 1 and being seen in the direction of this arrow; and Figures 9 and 10 are separate views of the wire-lifting device and its co-operating tools, Fig. 9 showing the parts in that position in which the headed wire is drawn in, and Fig. 10 showing the parts in that position in which the point is being cut.

In the frame 1 of the machine the main shaft 2 is supported in known manner, and there are attached to it various cam-disks by which the various mechanisms and tools are actuated. Parallelly to the shaft 2 is provided a shaft 3 to which is attached an arm 4 which is moved by a cam-disk 5 affixed to the shaft 2.

The frame 1 supports also a cylindrical slide 6 in which the head-pressing die 7 is located above the axis thereof and is adjustable therein in its longitudinal direction, parallelly to said axis. A cover 8 which retains said die in the slide 6 is provided with an arm 9 which serves for the discharge of the finished tack.

In the arm 4 is located a semi-spherical bearing 10 (Fig. 1) against which the slide 6 is pressed by a spring 11 (Fig. 2). The slide 6 is provided with a lateral lug 12 (Figs. 2 and 7) upon which presses a vertical rod 14, the upper end of which is bent round so as to form a hook, and which is affixed at its lower end to a flat spring 13 (Fig. 2).

A bolt 15 (Fig. 2) carries a double-armed lever 16—18, the arm 16 of which supports a vertical rod 17, the upper end of which engages a cavity provided in the lower surface of the lug 12 (Figs 2, 6 and 7). The arm 18 of said double-armed lever carries a roll 18ª which contacts with the cam-disk 19 affixed to the shaft 2.

On the shorter of the two longitudinal sides of the machine is supported a guide-bar 20 (Figs. 1 and 4) which is hinged at one of its ends to the arm 21 of a double-armed lever 22—23, the arm 22 of which is provided with a roll 22ª and the arm 23 of which is provided with a roll 23ª. These rolls contact with cam-disks 24 and 25 by which the guide-bar 20 is reciprocated.

In front of the head-pressing die 7 a horizontal slide 26 is supported in the machine-frame and can be shifted at right angles to the direction in which the wire 31 (Figs. 1 and 2) is introduced into the machine. The slide 26 contacts at one of its vertical faces with a stationary member 27 of the machine, and in its other vertical face is a guide-way for a slide 28 (Fig. 1) which is shiftable in the direction of the slide 26. Each of these slides (26 and 28) carries a clamping die 29 and a knife 30, this latter being located above the former, and the arrangement relatively to the longitudinal axis of the wire 31 being such that the clamping dies lie below this axis and the knives above it.

The slide 26 is also provided with a comparatively large opening 32 through which the wire 31 passes, and behind this opening is a vertical guide-member 33 (Figs. 1, 2, 3, 6, 10) having a bore also for the passage of the wire; it is attached to the arm 34 of a double-armed lever 34—36 supported on a pivot 35, and the arm 36 of which is provided with a roll 36$^a$ contacting with a cam-disk 37 affixed to the main shaft 2. The downward movement of the arm 36 can be limited by a screw 38 provided therein, and by a stationary abutment member 38$^a$ for the screw.

Below the member 33 (Figs. 9 and 10) there is provided in the machine-frame an adjustable abutment-member 39 that extends upwards between the slides 26 and 28 and terminates in the plane of the lower line of the wire-passages provided in the opposite faces of the clamping dies 29, as shown in Figs. 9 and 10.

An angular arm 40 (Fig. 2) is attached to the upper surface of the slide 26 and extends over the knives 30. The end 41 of the downwardly directed part of this arm terminates in the plane of the upper line of the wire passages provided in said knives (Fig. 10).

Each of the slides 26 and 28 carries a bolt 42 upon which a bell crank lever is pivoted as clearly illustrated in Figure 3. The arms 43 of these bell crank levers are provided with adjusting screws 44, while the other arms 45 are disposed to face each other and bear against clamping dies 29 which are thereby pressed into their bearings. Pivoted to bolt 46 carried by the slides 26 and 28 are what I term double armed levers 47 and 49, the arms 47 of which carry adjusting screws 48 while the other arms 49 shift the knives 30 into their supports.

The free end 50 of the guide bar 20 as shown in Figure 1, is of cylindrical formation, and against this end 50 bear horizontally movable members 51 and 52 as shown in Figure 3. The other ends of said members 51 and 52 bear against the semi-circular projections 53 and 54 of the slides 26 and 28. Mounted upon the slide 26 is a double armed lever 55$^a$, the lower arm of which is actuated by a spring 55 which is affixed to the frame of the machine, while the other arm of the lever 55$^a$ bears against a hook shaped projection 28$^a$ of the slide 28. The spring 55 effects movement of the slide 26 in the direction designated by the arrow $r$ and simultaneously the slide 28 is moved in the direction of the arrow $s$, whereby the slides are held in contact with the toggle levers 51 and 52.

The wire 31 is moved forward to and into the machine by means of a slide 56 (Figs. 1 and 2) guided in a slot 1$^b$ of an extension 1$^a$ of the frame 1 and being reciprocated at right angles to its longitudinal axis by a connecting-rod 57 (Figs. 1 and 8) and a bell-crank lever 58 provided with an adjusting-slot 58$^a$ for the rod 57, as well as with a roll 58$^b$ contacting with a cam-disk 59 affixed to the shaft 2. The bell-crank lever 58 is supported on a bolt 58$^c$ secured to the frame of the machine. The rod 57 and the slide 56 are connected with one another by a bolt 56$^a$ (Figs. 1 and 8).

The wire is clamped fast on the slide 56 by two arms 60 arranged in a groove 56$^b$ of the slide and forming an obtuse angle. Each of these arms bears against one wall of the groove, and the wire passes through between the free ends of the arms 60 which are pressed against one another or, more precisely, against the wire passing through between said ends by a curved flat spring 61. One of the arms 60 bears not directly against the respective groove-wall, but against an adjusting-member 60$^a$ inserted thereinto and being movable by an adjusting-screw 62 (Fig. 1). The adjustment is such that the arms 60 grasp, and clamp fast, the wire securely, preventing it effectively from merely gliding along between the arm-ends.

A particularly favorable effect of the arrangement and combination of parts described in the preceding paragraph is that the wire does not receive scratches and notches as is the case with those wire-tack making machines in which chisel-like members are employed for feeding the wire forward.

The arms 60 give way easily when the slide 86 performs its rear-stroke, the wire remaining then at rest and being, moreover, retained by the retaining-device 63 (Fig 1).

The manner of operation of the machine is as follows:

The head-pressing die 7 which is located in the cylindrical slide 6 (Figs. 6 and 7) is devised for the preliminary jolting or upsetting, as well as for the final one. That part of the slide 7 which effects one or the other jolting or upsetting work can be moved into the wire-axis by a corresponding rotation of said slide. This rotation is effected by the cam-disk 19 (Fig. 2) which acts on the lug or arm 12 of the slide by the intermediary of the double-armed lever 16—18 and the rod 17. When the roll 18$^a$, of the lever-arm 18 rolls over the part $a$ of the cam-disk 19 the head-pressing die is in that position in which the preliminary jolting or upsetting is effected, whereas the final jolting or upsetting takes place when the roll 18$^a$ runs on the part $b$ of said cam-disk.

The longitudinal movement of the cylindrical slide 6 is effected in known manner by the lever 4 which is operated by the cam-disk 5, the spring 11 keeping the slide constantly in contact with this lever.

The guide-rod 20 is reciprocated by the cam-disks 24 and 25 (Fig. 4). When said guide-rod is shifted in the direction indicated by the arrow $x$ (Fig. 1), the toggle-joint 51, 50, 52 is stretched whereby the clamping dies 29 and the knives 30 are moved towards one another.

Fig. 2 shows the position of the parts when a tack-head is being pressed. The wire 31 has been pressed down by the guide-member 33 as far as to register with the horizontal passage-forming notches in the clamping dies 29, the accurate position of the wire being ensured by the abutment-member 39. While the wire is caused by the guide-member 33 to move upwards and downwards it is retained horizontally by the device 63

Now the working members attached to the slides 26 and 28 are moved towards each other by means of the toggle-lever 51, 50, 52 (Fig. 1) and the parts actuating it, and the working members remain in this position until the tack-head has been formed. The die-part effecting the preliminary jolting or upsetting is located at first opposite the clamped-in wire. The preliminary jolting or upsetting having been effected, the cylindrical slide 6 is turned by means of the cam-disk 19 and the intermediary of the lever 16—18, and now the tack-head is finally jolted or upset by another forward movement of the die 7.

When the die 7 is withdrawn, the clamping dies are separated from one another by the action of the part $d$ of the cam-disk 24 (Fig. 4). Now the wire is so much lifted by the guide-member 33 and the parts actuating it that it gets to lie above the die 7. Instantly hereafter the wire-feeding members 60 (Fig. 1) and the members actuating the slide 56 shift the wire forward as much as is required for a tack, and then the wire is lifted by the member 33 to the height of the knives 30, the abutment member 41 causing the wire to register accurately with the middle of the cutting edges of the knives.

The slides 26 and 28 are now moved by the part $e$ of the cam-disk 24 (Fig. 4) whereby the knives are moved towards one another in such a manner that they cut the point of the tack.

Then said slides are moved away from one another, and now the discharge-member 9 (Fig. 7) is actuated. As, in order to produce another tack, the die 7 must be moved back into its original position, the cylindrical slide 6 must be turned in order to bring the means for the preliminary jolting or upsetting into the wire-axis. By this rotary motion of the slide 6 the arm 9 which up to then was situated at the side of the wire is turned below the wire-axis whereby the finished tack is discharged laterally.

When the slides 26 and 28, or, more precisely, the working members attached to them, have again been withdrawn from the wire, this latter is pressed by the guide-member 33 down into the position shown in Fig. 2, whereafter the working-phases described are repeated, and so on.

Owing to the particular arrangement and movements of the slides 26 and 28 the forces arising while the pressing-phases proceed are not transmitted to the frame of the machine, and owing to the provision of the toggle-lever 51, 50, 52 a greater pressure is produced and the cam-disks are relieved. Further, owing to the clamping dies 29 and the knives 30 being supported in one pair of slides and are actuated by one driving member, viz, the rod 20, the number of the driving members is diminished and the machine simplified. And, finally, owing to the short movements of the various operating members of the machine this latter can work at a higher speed whereby its output is increased.

I claim:

1. A machine for the manufacture of wire-tacks, comprising, in combination: wire feeding means; a slide arranged at right angles to the wire-axis and having an aperture for the passage of the wire; means for guiding said slide; another slide guided on the first-mentioned one; a pair of wire clamping means affixed to the two slides in juxtaposition below said aperture; a pair of tack-point cutting means also affixed to said two slides in juxtaposition above the said aperture; a toggle-joint lever located between an end-face of the second slide and an angular end-piece of the first slide; a bar arranged to be shiftable parallelly to the wire and bearing with one end on the middle member of said toggle-lever; means to reciprocate said bar; means to actuate said slides with the working members attached to them in proper timing with the other working operations of the machine, and means for feeding the wire, substantially as set forth.

2. A machine for the manufacture of wire-tacks, comprising, in combination:

wire-feeding means; a slide arranged at right angles to the wire and having an aperture for the passage of the wire; means for guiding said slide; another slide guided on the first-mentioned one; a pair of clamping means attached to the two slides in juxtaposition below said aperture; a pair of tack-point cutting means also affixed to said two slides in juxtaposition above the said aperture; a vertically movable wire-guiding member arranged between the first-mentioned slide and said wire-clamping means, as well as said point-cutting means, and being adapted to move the wire from the first of these means to the second thereof, and reversely; means to actuate said slides with the working members attached thereto, as stated, substanitally as set forth.

3. A machine for the manufacture of wire-tacks, comprising, in combination: wire-feeding means; a slide arranged at right angles to the wire and having an aperture for the passage of the wire; means for guiding said slide; another slide guided on the first-mentioned one; a pair of clamping dies attached to the two slides in juxtaposition below said aperture; a pair of tack-point cutting-knives also attached to said two slides in juxtaposition above the said aperture; a vertically movable wire-guiding member arranged between the first-mentioned slide and said wire-clamping dies, as well as said point-cutting knives, and being adapted to move the wire from the first of these means to the second thereof; a lever having said wire-guiding member attached to it and being supported on a pivot, the axial line of which intersects the axial line of the aperture in the first-mentioned slide; means to actuate this lever and the two slides with the working members mentioned and attached thereto in proper timing with the other working operations substantially as set forth.

4. A machine for the manufacture of wire-tacks, comprising, in combination: wire-feeding means; a slide arranged at right angles to the wire and having an aperture for the passage of the wire; means for guiding said slide; another slide guided on the first-mentioned one; a pair of clamping dies attached to the two slides in juxtaposition below said aperture; a pair of tack-point cutting-knives also attached to said two slides in juxtaposition above the said aperture; a vertically movable wire-guiding member arranged between the first-mentioned slide and said wire-clamping dies, as well as said point-cutting knives, and being adapted to move the wire from the first of these means to the second thereof; a lever having said wire-guiding member attached to it and being supported on a pivot, the axial line of which intersects the axial line of the aperture in the first-mentioned slide; a cam-disk arranged to oscillate said lever and means to rotate this cam disk and to actuate the two slides with the working members mentioned and attached thereto, substantially as set forth.

5. A machine for the manufacture of wire-tacks, comprising, in combination: wire-feeding means; a slide arranged at right angles with respect to the wire and having an aperture for the passage of the wire; means for guiding said slide; another slide guided in the first-mentioned one; a pair of clamping means attached to the two slides in juxtaposition below said aperture; a pair of tack-point cutting-means also affixed to said two slides in juxtaposition above the said aperture; a vertically movable wire-guiding member arranged between the first-mentioned slide and said wire-clamping means, as well as said point-cutting means, and being adapted to move the wire from the first of these means to the second thereof, and reversely; an abutment member adapted to be adjusted vertically in the machine-frame near the rear faces of the said wire-clamping members at the opposite end-faces thereof, means to actuate the said slides with the working-members attached thereto, as stated, substantially as set forth.

6. A machine for the manufacture of wire-tacks, comprising, in combination: wire-feeding means; a slide arranged at right angles to the wire and having an aperture for the passage of the wire; means for guiding said slide; another slide guided on the first-mentioned one; a pair of clamping means attached to the two slides in juxtaposition below said aperture; a pair of tack-point cutting-means also affixed to said two slides in juxtaposition above the said aperture; a vertically movable wire-guiding member arranged between the first-mentioned slide and said wire-clamping means, as well as said point-cutting means, and being adapted to move the wire from the first of these means to the second thereof, and reversely; an adjustable abutment-member located on the first-mentioned slide and being adapted to limit the upward movement of the wire lifted by said wire-guiding member, another abutment member adapted to be adjusted vertically in the machine-frame near the rear faces of the said wire-clamping members at the opposite end-faces thereof; and means to actuate the said slides, substantially as described.

7. A machine for the manufacture of wire-tacks, comprising, in combination: a pair of slides; guide-means therefor; wire clamping dies attached to the two slides; supports for these dies; bell-crank levers hinged to the said slides and arranged to press said dies onto said supports; tack-point cutting means also attached to said slides; means to actuate these latter with their wire-clamping means and their point-cutting means in proper timing with the other working-operations, and means for feeding the wire, the said slides being so arranged as to be movable at right angles with respect to the wire, substantially as set forth.

8. A machine for the manufacture of wire-tacks, comprising, in combination: wire feeding means; a slide arranged at right angles to the wire and having an aperture for the wire-passage; means for guiding said slide; another slide guided on the first-mentioned one; a pair of wire clamping dies attached to the two slides in juxtaposition below said aperture; double-armed levers arranged on the top faces of the two slides over said clamping dies and having each one of its arms so shaped and arranged as to be adapted to press one of the said dies against the respective slide-face, a pair of tack-point cutting means also affixed to said two slides in juxtaposition above the said aperture; and means to actuate the said slides, substantially as set forth.

9. A machine for the manufacture of wire-tacks, comprising, in combination: a pair of slides and guide-means therefor; wire-clamping means attached to the two slides; tack-point cutting knives also attached to said slides above said clamping dies; means to actuate these latter with the said parts attached thereto; a rotary and shiftable slide arranged opposite the said clamping parts parallel to the wire-axis; a tack-head pressing die arranged eccentrically in said latter slide means for operating the tack head pressing die so as to lie co-axially with the wire; means to turn and to shift the said rotary and shiftable slide; means to actuate the wire-clamping means and the point-cutting means in proper timing with the other operations of the machine, and means for feeding the wire into the machine, substantially as set forth.

10. A machine for the manufacture of wire-tacks, comprising, in combination: a pair of slides; guide-means therefor; wire-clamping means attached to the two slides; tack-point cutting knives attached to said slides above said clamping dies; means to actuate these latter with the said parts attached thereto; a rotary and shiftable slide arranged opposite the said clamping parts parallel to the wire; a tack-head pressing-die arranged eccentrically in said latter slide and being adapted to be turned so as to lie co-axially with the wire; a lug projecting forth laterally from the said rotary slide; two rods, of which one contacts at one end with the lower face of said lug, and the other contacts with the upper face thereof; a double-armed lever, of which one arm forms a support for the first-mentioned rod, and a cam-disk arranged to act on the other arm of this lever; a spring connected with the other end of the other rod and arranged to counteract the action of the said first-mentioned rod; means to turn and to shift the said rotary and shiftable slide; means to actuate the wire-clamping means and the point-cutting means, and means for feeding the wire to these means, substantially as set forth.

11. A machine for the manufacture of wire-tacks, comprising, in combination: a pair of slides and guide-means therefor; wire-clamping means attached to the two slides; tack-point cutting-knives attached to said slides above said clamping dies; means to actuate these latter with the said working members attached thereto; a rotary and shiftable slide arranged opposite the said clamping parts parallel to the wire; a tack-head pressing-die arranged eccentrically in said latter slide and being adapted to be turned so as to lie co-axially with the wire; a plate affixed to the rotary slide and arranged to hold said head-pressing die firmly in place; and an arm projecting forth from said plate and adapted to discharge the finished tack from its support; means to turn and to shift the said rotary and shiftable slide; means to actuate the wire-clamping and the point-cutting means, and means for feeding the wire into the machine, substantially as set forth.

12. A machine for the manufacture of wire-tacks, comprising, in combination: wire-feeding means; a slide arranged at right angles to the wire and having an aperture for the passage of the wire; means for guiding said slide; another slide guided in the first-mentioned one; a pair of wire clamping means affixed to the two slides in juxtaposition below said aperture; a pair of tack-point cutting means also affixed to said two slides in juxtaposition above the said apertures; a toggle-lever located between an end-face of the second slide and an angular end-piece of the first slide; a bar arranged to be shiftable parallel to the wire and bearing with one end on the middle member of said toggle-lever; a bell-crank lever connected with the other end of said bar, and a cam-disk having two cams of equal height, of which one is arranged to actuate the wire clamping means and the other is arranged to actuate the point cutting means by the intermediary of the said toggle-joint lever and the said slides; and means for feeding the wire into the machine and to the working members carried by the slides, substantially as described.

In testimony whereof I affix my signature.

JAKOB WIKSCHTRÖM.